(12) United States Patent
Kovan et al.

(10) Patent No.: US 10,971,922 B2
(45) Date of Patent: Apr. 6, 2021

(54) REDUCTION OF GEOMAGNETICALLY INDUCED CURRENTS BY NEUTRAL SWITCHING

(71) Applicant: NEW YORK UNIVERSITY, New York, NY (US)

(72) Inventors: Baris Kovan, Reading, PA (US); Francisco De Leon, Bogota, NJ (US)

(73) Assignee: NEW YORK UNIVERSITY, New York, NY (US)

( * ) Notice: Subject to any disclaimer, the term of this patent is extended or adjusted under 35 U.S.C. 154(b) by 747 days.

(21) Appl. No.: 15/568,439

(22) PCT Filed: Apr. 12, 2016

(86) PCT No.: PCT/US2016/027139
§ 371 (c)(1),
(2) Date: Oct. 20, 2017

(87) PCT Pub. No.: WO2016/171960
PCT Pub. Date: Oct. 27, 2016

(65) Prior Publication Data
US 2018/0145504 A1   May 24, 2018

Related U.S. Application Data

(60) Provisional application No. 62/151,930, filed on Apr. 23, 2015.

(51) Int. Cl.
*H02H 7/22* (2006.01)
*H02H 1/00* (2006.01)
(Continued)

(52) U.S. Cl.
CPC .............. *H02H 7/226* (2013.01); *H01F 27/34* (2013.01); *H02H 1/0007* (2013.01); *H02H 9/00* (2013.01);
(Continued)

(58) Field of Classification Search
CPC ........ H01F 27/34; H02H 1/0007; H02H 3/00; H02H 3/006; H02H 3/025; H02H 3/08;
(Continued)

(56) References Cited

U.S. PATENT DOCUMENTS

| | | |
|---|---|---|
| 5,179,489 A | 1/1993 | Oliver |
| 5,814,777 A | 9/1998 | Green et al. |

(Continued)

FOREIGN PATENT DOCUMENTS

WO    WO-2012171995 A1 * 12/2012 ............... H02H 7/22

OTHER PUBLICATIONS

Space Studies Board, National Research Council, "Severe Space Weather Events—Understanding Societal and Economic Impacts", 2008, 145 pages, The Nat. Academies Press, Washington, DC.

(Continued)

*Primary Examiner* — Jared Fureman
*Assistant Examiner* — Nicolas Bellido
(74) *Attorney, Agent, or Firm* — Foley & Lardner LLP

(57) ABSTRACT

Methods, systems, and apparatuses are disclosed for reducing geomagnetically-induced currents. The method includes connecting a plurality of switching devices at a neutral grounding connection point of at least one transformer bank. In a system having two terminals, the method includes grounding one transformer bank through a switch so as to reduce geomagnetically induced current. In a system having more than two terminals, the method includes grounding transformer banks through multiple switches, where the reduction is performed independently for each transformer bank. The method further involves determining a switching frequency and a duty cycle based on an evaluation of factors including effectiveness and fault current detection.

19 Claims, 14 Drawing Sheets

(51) Int. Cl.
  H02H 9/00 (2006.01)
  H01F 27/34 (2006.01)
  H02H 9/04 (2006.01)
  H02H 9/02 (2006.01)
(52) U.S. Cl.
  CPC .............. *H02H 9/02* (2013.01); *H02H 9/041* (2013.01); *H02H 9/042* (2013.01)
(58) Field of Classification Search
  CPC .. H02H 3/20; H02H 3/50; H02H 5/00; H02H 5/005; H02H 7/04; H02H 7/226; H02H 9/00; H02H 9/02; H02H 9/041; H02H 9/042
  See application file for complete search history.

(56) References Cited

U.S. PATENT DOCUMENTS

| | | | |
|---|---|---|---|
| 5,930,099 | A | 7/1999 | Legro et al. |
| 6,459,349 | B1 | 10/2002 | Giday et al. |
| 8,537,508 | B2* | 9/2013 | Faxvog ................ H02H 5/005 361/35 |
| 8,878,396 | B2* | 11/2014 | Faxvog .................. H02H 3/52 307/126 |
| 9,077,172 | B2* | 7/2015 | Faxvog .................. H02H 7/04 |
| 10,199,821 | B2* | 2/2019 | Fuchs ..................... H02H 3/50 |
| 2007/0145952 | A1 | 6/2007 | Arcena |
| 2008/0232006 | A1 | 9/2008 | Ramirez et al. |
| 2009/0225483 | A1 | 9/2009 | Veroni |
| 2012/0081097 | A1 | 4/2012 | Brinbach |
| 2013/0308229 | A1* | 11/2013 | Faxvog ................ H02H 3/338 361/35 |
| 2015/0226772 | A1* | 8/2015 | Kreikebaum .......... G01R 21/08 324/244 |
| 2016/0197469 | A1* | 7/2016 | Fuchs ..................... H02H 3/20 361/35 |
| 2018/0205217 | A1* | 7/2018 | Fuchs ..................... H02H 3/20 |

OTHER PUBLICATIONS

Agelidis, V.G., et al., Summary of "Recent Advances in High-Voltage Direct-Current Power Transmission Systems", ICIT Industrial Technology IEEE International Conf., Mumbai, India, Oct. 9, 2007, 2 pages.

Berge, J., et al., "A software simulator for geomagnetically induced currents in electrical power system", 2009 Electrical and Computer Engineering CCECE Canadian Conf., 2009, pp. 695-700.

Chandrasena, W., et al., "Modeling GIC Effects on Power Systems: The Need to Model Magnetic Status of Transformers", Proc. 2003 IEEE Bologna PowerTech Conf., Bologna, Italy, vol. 2., 6 pages.

Jayasinghe, R.P., et al., "Effect of GIC on overcurrent protection for filter banks", Proc. 1993 WESCANEX, Communications, Computers and Power in Modern Environment Conf., 1993, pp. 36-42.

Kappenman, J.G., "GIC Mitigation: A Neutral Blocking/Bypass Device to Prevent the Flow of GIC in Power Systems", IEEE Trans. Mag., Jul. 1991, 6(3):1271-1281.

Kappenman, J.G., "Low-frequency protection concepts for the electrical power grid: Geomagnetically Induced Current (GIC) and E3 HEMP Mitigation", Jan. 2010, Oak Ridge Nat. Laboratory, Oak Ridge, TN, Rep. Meta-R-322, 94 pages.

Kappenman, J.G., "Mitigation of Geomagnetically Induced and DC Stray Currents", Dec. 1983, EPRI, Duluth, MN, Rep. EL-3295, 198 pages.

Larose, D., "The Hydro-Quebec System Blackout of Mar. 13, 1989," IEEE Special Panel Discussion Report on the Effect of Solar-Geomagnetic Disturbances on Power Systems, IEEE PES Summer Power Meeting, Long Beach, CA, Jul. 1989, 19-1-19-11.

NERC, "Effects of Geomagnetic Disturbances on the Bulk Power Systems", 2012 Special Reliability Assessment Interim Report, Feb. 2012, 150 pages, NERC, Atlanta, GA.

NERC, "Geo-Magnetic Disturbances (GMD): Monitoring, Mitigation, and Next Steps", Oct. 2011, 76 pages, Nerc , Atlanta, GA.

Phillips, T., "Severe Space Weather—Social and Economic Impacts", <http://science.nasa.gov/science-news/science-at-nasa/2009/21jan_severespaceweather/>, Jan. 21, 2009, 3 pages.

Pirjola, R.J., et al., "Geomagnetically Induced Currents in European High-Voltage Power Systems", 2006 Electrical and Computer Engineering CCECE Canadian Conf., May 2006, pp. 1263-1266.

Tyll, H.K., "FACTS Technology for Reactive Power Compensation and System Control", 2004 IEEE/PES Transmission and Distribution Conf. and Exposition, Latin America, Nov. 8-11, 2004, pp. 976-980.

Volkman, T., "Geomagnetic Induced Current (GIC) Mitigation System Summary for the White Paper", <http://www.nerc.com/comm/PC/Geomagnetic%20Disturbance%20Task%20Force%20GMDTF%20DL/NERC%20Mitigation%20System%20Summary%20for%20White%20Paper%20-%20Final.pdf>, 2012, 7 pages, NERC, Atlanta, GA.

Walling, R.A., et al., "Characteristics of Transformer Exciting-Current During Geomagnetic Disturbances", IEEE Trans. On Power Delivery, Oct. 1991, 6(4):1707-1714.

Jayasinghe, R.P., "Investigation of Protection Problems due to Geomagnetically Induced Currents", Ph.D. dissertation, Univ. Manitoba, Winnipeg, Manitoba, Canada, Oct. 1996, 164 pages.

De Leon, F., et al., "Comparing the T and Pi Equivalent Circuits for the Calculation of Transformer Inrush Currents", IEEE Trans. Power Delivery, Oct. 2012, 27(4)2390-2398.

International Search Report and Written Opinion for PCT/US2016/027139, dated Jul. 6, 2016, 11 pages.

* cited by examiner

Devices Usable at the Transformer neutral For Mitigation of GICs

| 1. | o—o͟ o—o | Disconnect at Neutral |
|---|---|---|
| 2. | ⁓⁓⁓ | Inductor at Neutral |
| 3. | -⋀⋀⋀- | Resistor at Neutral |
| 4. | —)(— | Capacitor at Neutral |
| 5. | ⌐o̸⌐ ⊣⊢ | Capacitor with by-pass at Neutral |

Fig. 19

REDUCTION OF GEOMAGNETICALLY INDUCED CURRENTS BY NEUTRAL SWITCHING

CROSS-REFERENCE TO RELATED PATENT APPLICATIONS

This application is the U.S. national phase under 35 U.S.C. § 371 of International Application No. PCT/US2016/027139, filed Apr. 12, 2016, which claims priority to and benefit of U.S. Provisional Patent Application No. 62/151,930, filed Apr. 23, 2015, the entire disclosures of which are incorporated herein by reference.

FIELD OF THE INVENTION

The present invention generally relates to management of geomagnetically induced currents.

BACKGROUND

Geomagnetically induced currents (GICs) are the product of variations in the Earth's normally static magnetic field. These variations are caused typically by plasma discharges from the sun (e.g., solar flares) and coronal mass ejections (CMEs) that hurl vast amounts of magnetized plasma into space. Low frequency currents caused by this solar activity flow on earth and on long man-made conduction paths (transmission lines) that essentially serve as antennae. GICs are quasi-DC currents that can disrupt the normal operation of power systems and which may, in some cases, even damage equipment.

As observed in past geomagnetic disturbance (GMD) events, the half-cycle saturation of high voltage transformers may give rise to harmonics, heating and increased need for reactive power compensation. The most severe recorded GMD event was the Carrington event in 1859, in which auroras were observed. At the time of the Carrington event, there was no power grid. However, today's power systems are becoming increasingly more vulnerable to GMD.

Today's power grid is an interconnected set of long distance transmission lines designed to carry high voltage long distances and local distribution lines designed for distribution to local users. Within the power grid system and connected thereto are power plants for baseload and peaker plants as well as numerous substations and transformers. The high-voltage transmission system is particularly susceptible to GIC because of the focus on high voltage and low resistance in such lines. In North America, the power grid is divided into large but interconnected regions managed by Regional Transmission Organizations and Independent System Operators, with the regions spanning dozens of states and having thousands of miles of lines. An event of proportions comparable to the Carrington event could have devastating consequences for power systems. Space storms of the magnitude of the Carrington event could cause a long-term catastrophic power grid collapse with major socioeconomic disruptions.

SUMMARY

In one implementation, a method for reducing GICs is provided. The method reduces a GIC in a system through a current reduction switching device, hereinafter referred to as a semiconductor GIC reducer ("SGICR"). To protect the SGICR against faults while in operation, a protection system is provided including at least one current transformer, a circuit breaker, an earthing switch, a bypass device, and a surge arrestor connected in parallel between a transformer neutral and a ground. The method includes setting a current threshold for the GIC, determining whether the GIC exceeds the threshold, and determining a switching frequency and a duty cycle for the current reduction device based on the level of GIC. When the GIC exceeds the current threshold, the method further includes closing the circuit breaker, opening the earthing switch, and causing the current reduction device to be in an operational state. When the GIC does not exceed the current threshold, the method further includes opening the first circuit breaker, closing the second circuit breaker, and causing the current reduction device to be in a non-operational state.

In one implementation, a system for reducing GICs is provided. The system includes a current reduction device configured to reduce a GIC, a plurality of current transformers; at least one circuit breaker; at least one surge arrestor configured to limit voltage below a voltage threshold; a bypass device configured to bypass the semiconductor device during a ground fault; at least one resistor configured to provide connection between a transformer neutral and a ground, and a detector configured to detect the geomagnetically induced current. The bypass device, resistor, surge arrestor, current reduction device and circuit breaker are connected in parallel between the transformer neutral and the ground.

In one implementation, a non-transitory computer-readable memory having instructions thereon is provided. More particularly, instructions are provided for a controller to reduce GICs in a system including at least one current transformer, a current reduction device, a circuit breaker, a bypass device, an earthing switch, and a surge arrestor connected in parallel between a transformer neutral and a ground. The instructions include instructions for setting a current threshold for the GIC, and determining whether the GIC exceeds the threshold. When the GIC exceeds the current threshold, further instructions are included for closing the circuit breaker, opening the earthing switch, and causing the current reduction device to be in an operational state. When the GIC does not exceed the current threshold, further instructions are included for opening the circuit breaker, closing the earthing switch, and causing the current reduction device to be in a non-operational state while having a solid neutral to ground connection.

Other variants of the aforementioned implementations include corresponding methods, systems, apparatuses, and computer-readable media.

Additional features, advantages, and implementations or embodiments of the present disclosure are apparent from consideration of the following detailed description, drawings, and claims. Moreover, it is to be understood that both the foregoing summary of the present disclosure and the following detailed description are exemplary and intended to provide further explanation without limiting the scope of the present disclosure and the claims.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings, in which:

FIG. 19 depicts some devices that may be used as neutral devices for the mitigation of GICs, followed by a brief summary of the mitigation approach associated with each device.

Figure 1:
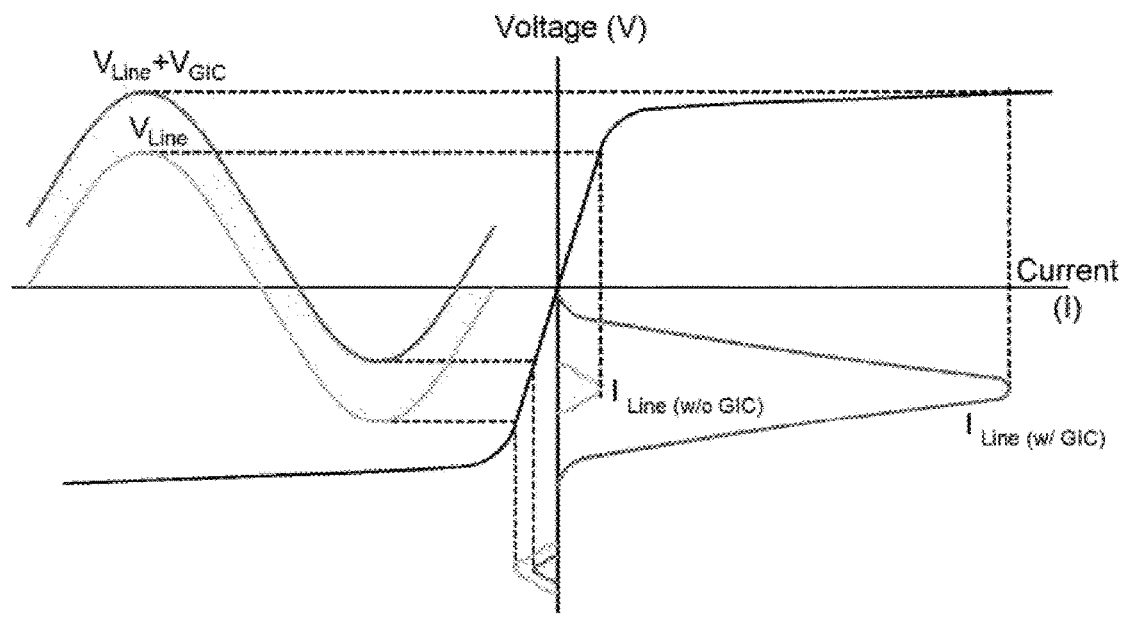
FIG. 1 depicts a half-cycle saturation due to DC voltage caused by geomagnetic disturbances (GMD).

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Notable geomagnetic disturbance (GMD) events that had a substantial effect on power system development included the geomagnetic storm of Mar. 13, 1989 and the Halloween solar storm of 2003. These events demonstrated that GMD poses a serious risk to power systems. In response, regulatory agencies have set forth operating procedures to mitigate GIC as guidelines for utility companies. At the same time, the power industry has started to produce solutions to mitigate GICs. Some devices that may be used as neutral devices for the mitigation of GICs are listed in FIG. 19, followed by a brief summary of the mitigation approach associated with each device.

A disconnect at neutral is a practical way to block a GIC. This approach entails disconnecting the neutral from the ground where the GIC enters. However, opening the neutral may cause unpredictable voltage transients. Furthermore, opening the neutral may also hinder the detection of a ground fault and may result in safety and insulation problems, especially under single phase to ground faults.

An inductor at the neutral may be used to mitigate GICs. Inductors are generally used in the neutral to reduce ground fault current levels. However, as the GIC frequency is relatively low, such an inductor may have a negligible effect at best in reducing GICs.

A resistor at the neutral does not eliminate GICs. However, a resistor at the neutral can substantially reduce GICs. Such a reduction comes at the cost of a loss in protection sensitivity, and is also associated with an increase in equipment size.

As for a solidly connected capacitor at the neutral, such a capacitor may be effective in completely eliminating GICs. Yet, solidly connected capacitors at the neutral have a drawback in that they may cause ferroresonance. Solidly connected capacitors are especially prone to causing ferroresonance if they are present throughout a transformer system.

A capacitor at neutral with bypassing may mitigate ferroresonance. In this sense, such a capacitor may avoid the disadvantages associated with a solidly connected capacitor at the neutral described above. The capacitor at the neutral with bypass allows switching (of the capacitor) only during a GIC event. Therefore, such a device may reduce the likelihood of ferroresonance for the duration in which it is switched.

In addition to the neutral blocking devices mentioned above, serial capacitors in each phase of the transmission line may be employed to mitigate or block GICs from the line. In the case that serial capacitors are being used for reactance compensation, there is no need for further GIC mitigation devices. However, using serial capacitors for the sole purpose of blocking GIC may be infeasible or unjustifiable from a cost-benefit basis due to the high costs of obtaining and appropriately configuring a plurality of capacitors. The capacitors may completely block the GIC which in turn can cause even larger GIC flow in other lines.

In at least one implementation, a mitigation technique includes installing semiconductor switching devices between the transformer neutral and ground. When GICs are detected, a Semiconductor GIC Reducer (SGICR) opens and closes the connection to ground at 1 kHz. The switching action of the SGICR reduces the average DC current without completely blocking it. Thus, the disadvantages of completely disconnecting the neutral—for example, unpredictable voltage transients and difficulties in detecting faults—may be mitigated or eliminated.

In at least one implementation, such an approach is applied to a single-phase transformer. Single-phase transformers are vulnerable to half-cycle saturation, particularly because their DC flux has the lowest resistance path through the core of the transformer compared to other types of transformers. Thus, semi-saturation can occur for relatively low levels of GICs. In addition, the largest GIC flow in a high-voltage (HV) network normally takes place at voltage levels above 230 kV. FIG. 1 depicts a half cycle saturation due to DC voltage caused by GMD.

Transmission circuits below 230 kV generally have much higher DC resistance per unit length, and their contribution may be frequently ignored without a detrimental effect. Furthermore, transmission lines for voltage levels higher than 230 kV tend to be relatively longer. Therefore, the longer the transmission line, the higher the potential difference between neutral points of the two terminal transformers. Magnetic variation due to solar activity induces a geoelectric field which produces voltage between 1.2 and 6 V/km. Moreover, for 500 kV lines up to 200-300 miles, there is almost a linear relationship between the length and the induced DC current.

Single-phase transformers are susceptible to damage and performance issues due to GICs. In view of these considerations, the transformer systems and methods of the illustrative implementations were evaluated based on a "worst case scenario" of large GICs in a high-voltage network. As illustrated in FIG. 1, the geoelectric field may cause a DC shift in the transformer flux. The flux may exceed the knee point of the core of the transformer, corresponding to the transformer operating beyond the linear portion of the transformer's B-H (flux-field-strength) curve at each half-cycle. Operating beyond the linear portion causes current to rise continuously in each cycle, as long as the DC current is present, until the transformer system can no longer handle the high magnitude unbalanced half-cycle saturation. The saturation level depends on the amount of GIC, and B-H characteristics such as operating point, air core inductance, and transformer design type.

Figure 2:
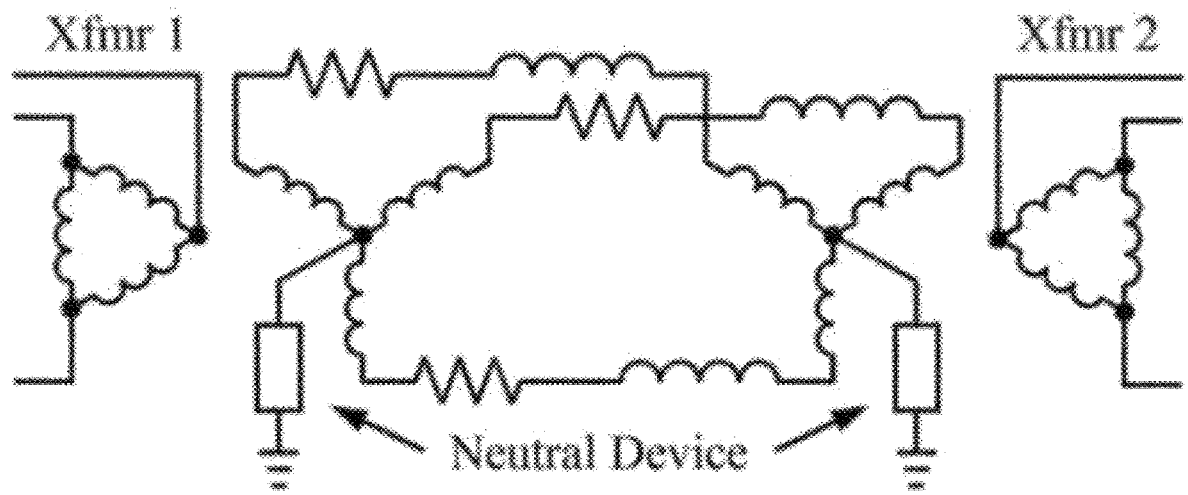
FIG. 2 depicts a power system configured to compute and mitigate GICs, in accordance with an illustrative implementation.

FIG. 2 depicts a power system having an SGICR configured to compute and mitigate GIC, in accordance with an illustrative implementation. According to at least one implementation, the SGICR is configured to control switching of the connection to ground for a system including at least one semiconductor switching device installed between the transformer neutral and ground. The SGICR may be configured to cause the at least one switching device to switch the connection to ground at 1 kHz, cutting off a path for quasi-DC GIC currents while preserving a path for AC currents. The effectiveness of such an approach may be appreciated from time-domain simulations on a realistic system, simplified for demonstration purposes. The GIC mitigation approach of at least one implementation may be technically feasible and affordable for numerous transformer applications.

Figure 3:
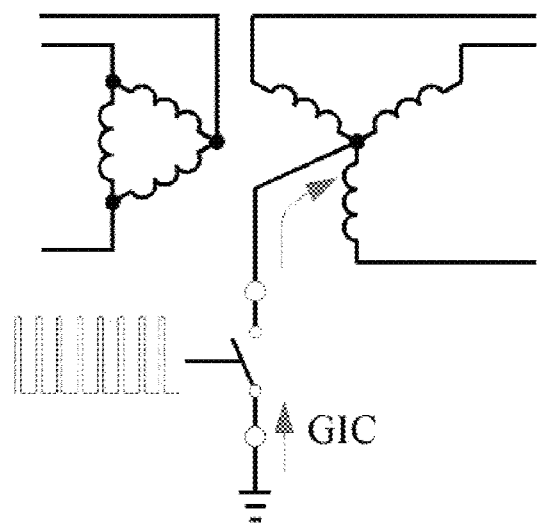
FIG. 3 depicts a semiconductor GIC reducer at a secondary neutral switching point, in accordance with an illustrative implementation.

As mentioned above, in at least one implementation, a semiconductor switch is employed at the neutral of the transformer, as shown in FIG. 3. The SGICR switches on and off at low to mid frequency, chopping off the DC voltage caused by GMD. Gate turn off thyristors (GTOs) or insulated gate bipolar transistors (IGBTs) may be used for the switching. GTOs and IGBTs for HVDC in medium power applications are viable candidates for switching devices.

In at least one embodiment, mitigation of GIC occurs due to the reduction of the half-cycle flux injected into the transformer. In some implementations, the rating of an SGICR may be relatively low because in steady state, the SGICR carries only the sum of the unbalanced load currents.

Figure 4:
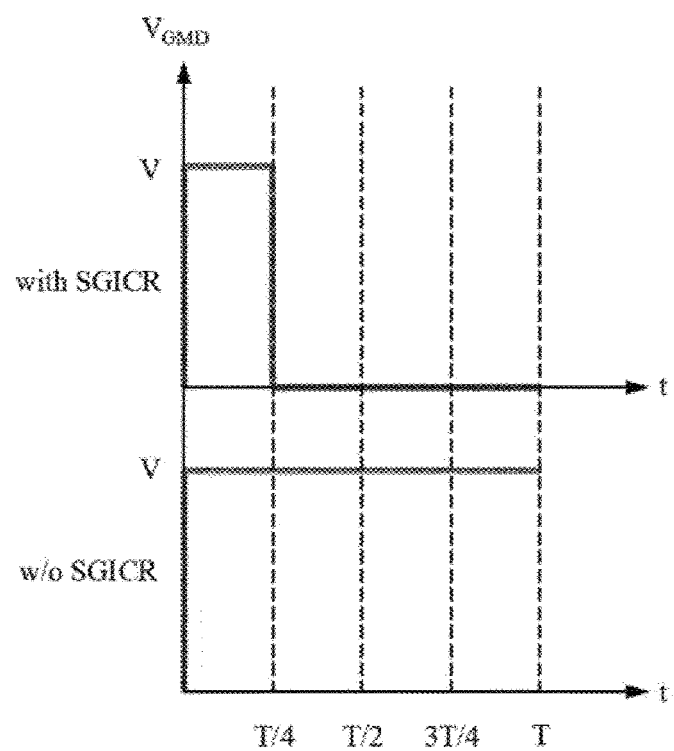
FIG. 4 depicts voltage caused by GICs with and without a semiconductor GIC reducer, in accordance with an illustrative implementation.

FIG. 4 compares GMD voltages injected into the transformer with and without the SGICR. It may be observed that the flux injected into the transformer is the area under the voltage given by Faraday's law, where V is the voltage and ϕ the flux:

$$V = \frac{d\Phi}{dt} \Rightarrow \Phi = \int Vdt \qquad (1)$$

Therefore, when a duty cycle of 0.25 is used, DC-flux injected by GMD is reduced to a quarter of its former value. Inasmuch as the DC-flux caused by GMD is reduced, the half-cycle saturation is also mitigated. This reduction changes depending on the time constant and whether there is a tertiary winding.

In at least one embodiment, the switching frequency is chosen according to several criteria and in accordance with various considerations. An ungrounded neutral may hinder the protection system from detecting ground faults and may allow neutral voltage to reach values that cause insulation hazards and safety risks. Therefore, the switching should be sufficiently fast such that the neutral voltage is kept close to zero by closing it to ground frequently. The switching frequency should allow a cost efficient device. Typically, higher frequencies require more expensive switching devices and associated components.

Additionally, some embodiments include devices configured to turn on and off with sufficient speed to meet the required duty cycle (D) and the frequency (f). For example, when D=0.25 and f=1.2 kHz, such a device is configured to switch on and off, with a 20-30 μs rise/fall time within 208 μs. The period T=1/f, and the on-time DT is 208 μs for at least one embodiment.

Furthermore, noise represents an additional consideration for frequency selection. Human hearing is generally in the range of 20 Hz to 20 kHz. Depending whether a station is in a residential area, an appropriate frequency should be chosen or sound attenuation should be established so as to produce an appropriate frequency.

In some circumstances, there may be no return path for GICs other than the neutrals of the transformers as shown in FIG. 2. There is no need for switching at both transformers in such circumstances. Switching at only one transformer may be sufficient to break the return path of the GICs and establish mitigation both at the local end and at the remote end. Thus, GICs may be mitigated efficiently.

Figure 5:
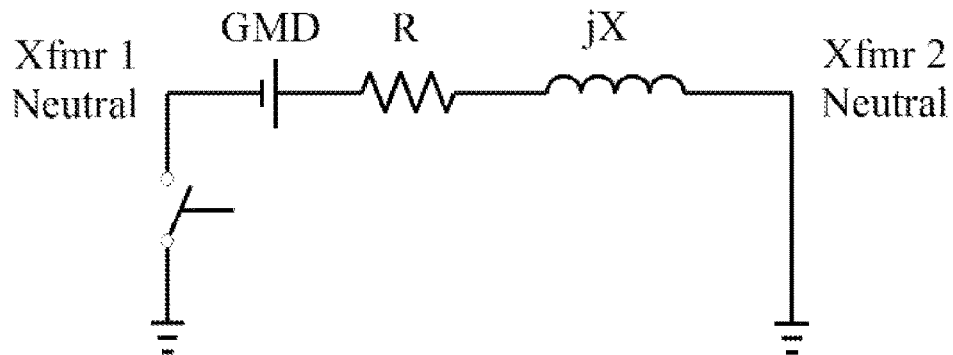
FIG. 5 depicts a simplified circuit in which GICs are mitigated, in accordance with an illustrative implementation.

Referring now to FIG. 5, a power system represented by a highly simplified circuit is depicted. The circuit of FIG. 5 is a simplification of the circuits of FIGS. 2 and 3, which respectively depict a power circuit used to mitigate GICs and a circuit with an SGICR at the secondary neutral. The circuit of FIG. 5 consolidates the resistances and reactances of these circuits together, and provides a return path through neutrals at each side of the circuit. No return path for GICs exists when the switch is opened. Accordingly, for a quantity n of neutral to ground connections in the system, n−1 switching devices are sufficient to mitigate GICs. However, if only one SGICR is used at one side, periodic testing with a supervisory alarm may be needed to decrease the chance of failure. If the cost were justified, SGICR at both sides would ensure GIC mitigation in case one fails.

Returning again to the SGICRs described above, fault currents available at the transmission level may be extremely high and may therefore cause significant damage to SGICRs. Accordingly, at least some embodiments implement protective schemes to mitigate the likelihood of damaging the SGICRs. In some embodiments, the implemented protective scheme may have some commonality with at least one of a neutral capacitor blocking device, a neutral DC blocking system, and an active ground device. In other embodiments, the implemented protective scheme may have some commonality with a flexible AC transmission system that may include a spark-gap or surge arrester for overvoltages and a fast operating bypass switch.

Figure 6A:
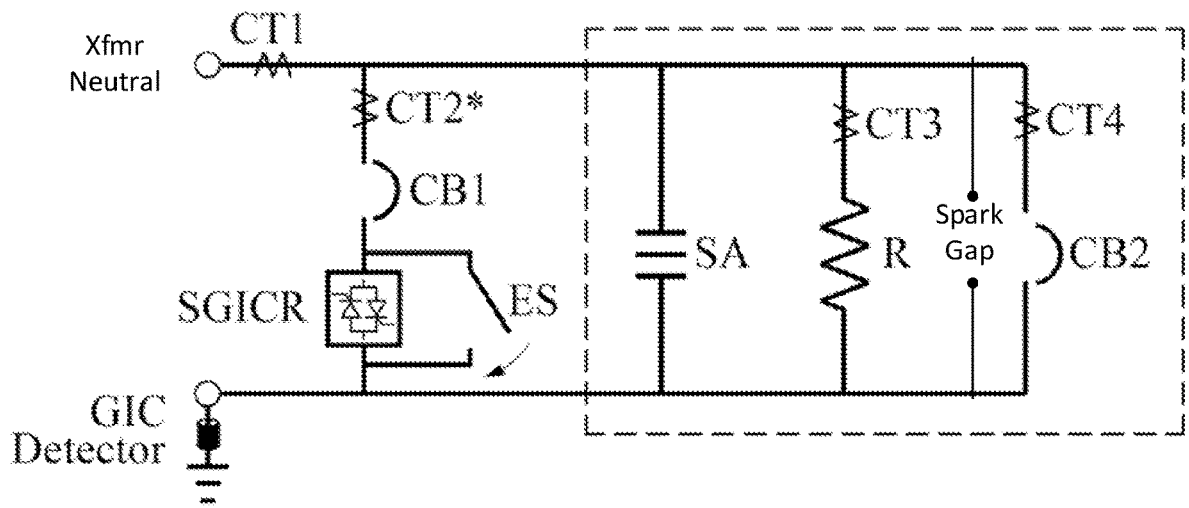
FIG. 6A depicts a complete circuit in which GICs are mitigated, in accordance with an illustrative implementation.
Figure 6B:
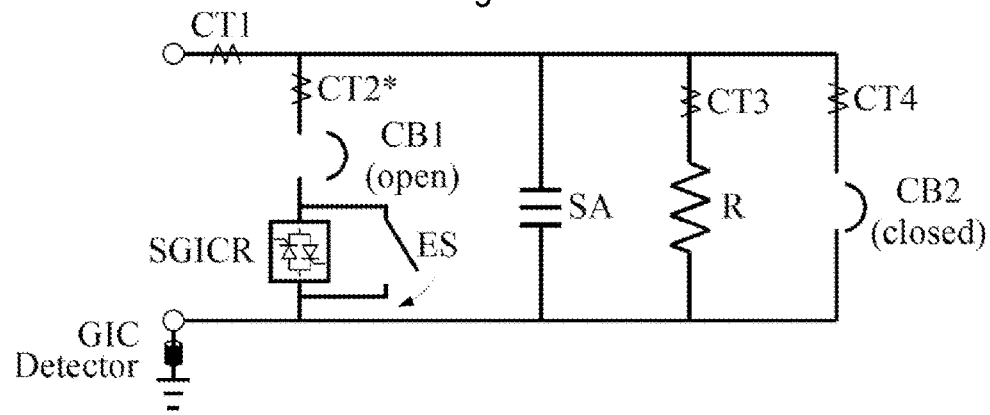
FIG. 6B depicts an alternative complete circuit in which GICs are mitigated, in accordance with an illustrative implementation.
Figure 6C:
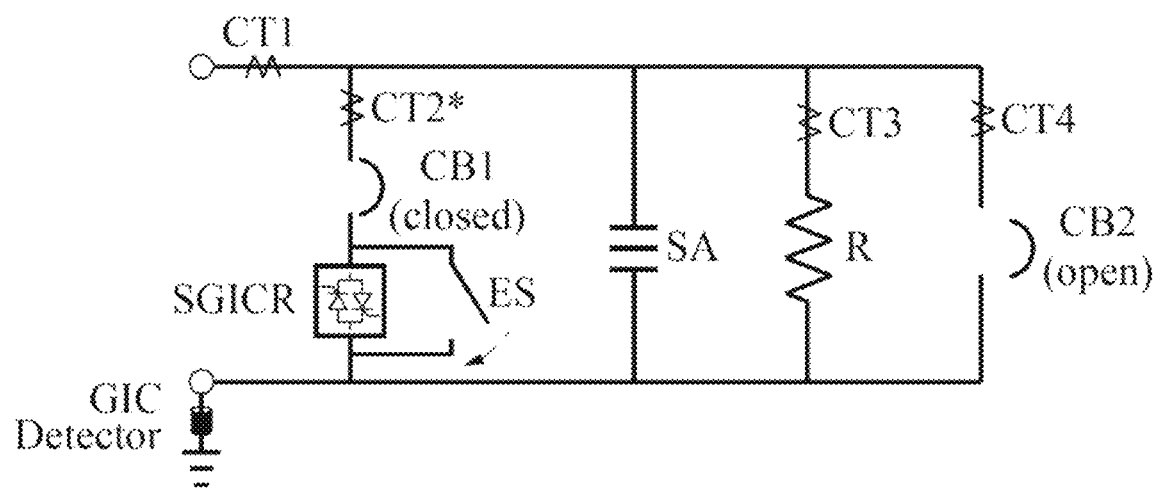
FIG. 6C depicts an alternative complete circuit in which GICs are mitigated, in accordance with an illustrative implementation.

Turning now to FIGS. 6A-C, illustrative implementations of protective schemes are depicted. The circuits of FIGS. 6A-C allow for the protection of an SGICR with circuit breakers CB1, CB2 in a system including the SGICR, a resistor R, and a surge arrestor SA. The circuit breaker CB2, the resistor R, and the surge arrestor SA are connected in parallel with the SGICR as a permanent bypass path. The SGICR may be further protected with an earthing switch ES as a temporary bypass, and with the first circuit breaker CB1 in series. In some embodiments, CB1 may alternatively be used as a fuse. The surge arrestor SA limits the voltage to be below its threshold. In some embodiments, a spark gap may also be employed in parallel to provide protection while diverting the current through the CB2. Employing the SA and the spark gap allows remaining shunt equipment to be sized below the threshold voltage, which may achieve a reduction in space as well as in overall cost.

Referring to FIGS. 6A-C, the resistor R in parallel is relatively large and provides a solid neutral to ground connection. A large resistor value may typically be several ohms used in the neutral. A resistor value above 10 ohms is not preferred due to decreased sensitivity of the relay protection. When implemented with SGICR according to certain embodiments, however, a lower impedance branch in parallel is already present. Thus, the value of the resistor may be far higher, about 50-100 ohms, for example. During the time of the transition to CB, a solid ground connection would be preserved.

The first and second circuit breakers CB1 and CB2 may be coordinated to bypass the SGICR in the event of ground faults such that the fault current is always diverted through CB2. The earthing switch ES, meanwhile, is designed to close more quickly than the circuit breakers CB1, CB2. The earthing switch ES diverts current around while circuit breakers CB1, CB2 are controlled to divert current to ground. In certain embodiments, CB1 is redundant to line circuit breakers. Thus, CB1 may be replaced with a fuse for cost savings. Furthermore, CB2 in some embodiments is not employed to interrupt current. Rather, CB2 is used to provide a solid connection to ground. Thus, in some embodiments, CB2 may be replaced with a circuit switcher or comparable components which are less costly.

Figure 17:
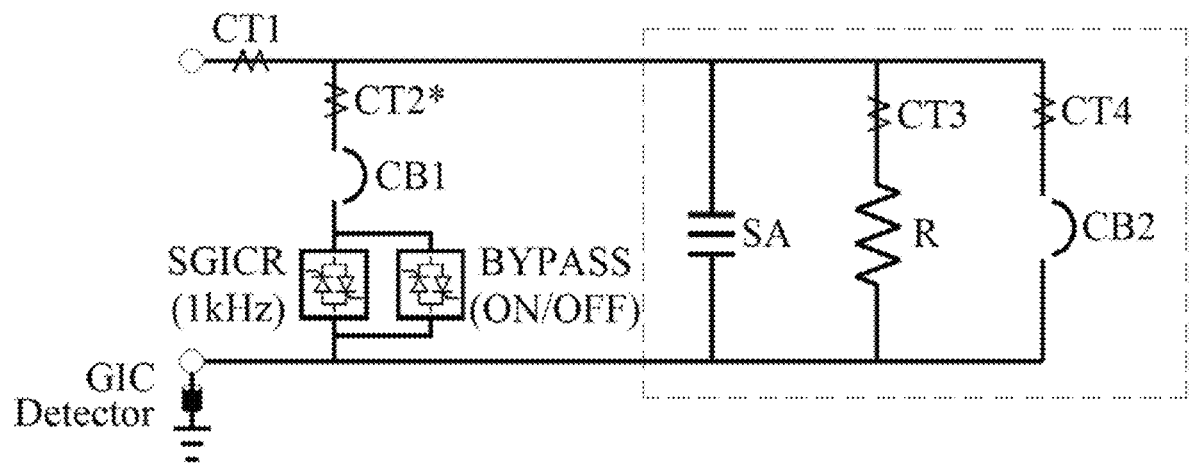
FIG. 17 depicts an alternative complete circuit in which GICs are mitigated, in accordance with an illustrative implementation.

Additionally, in some embodiments, thyristor valves or switches may be utilized as fast bypass devices in lieu of mechanical switches. That is, the earthing switch ES, which is mechanical, may be replaced with at least one thyristor, as shown in FIG. 17. Inasmuch as earthing switches are mechanical, their closing times are increased for higher levels of voltage. Thyristor switches, on the other hand, are semiconductor based. Thus, they may offer reduced form factors and enhanced ease of design, as well as potential cost-savings. A thyristor switch that can handle line ratings, close within 1.5 ms, and withstand through-faults may drastically simplify the overall system design.

Figure 7:
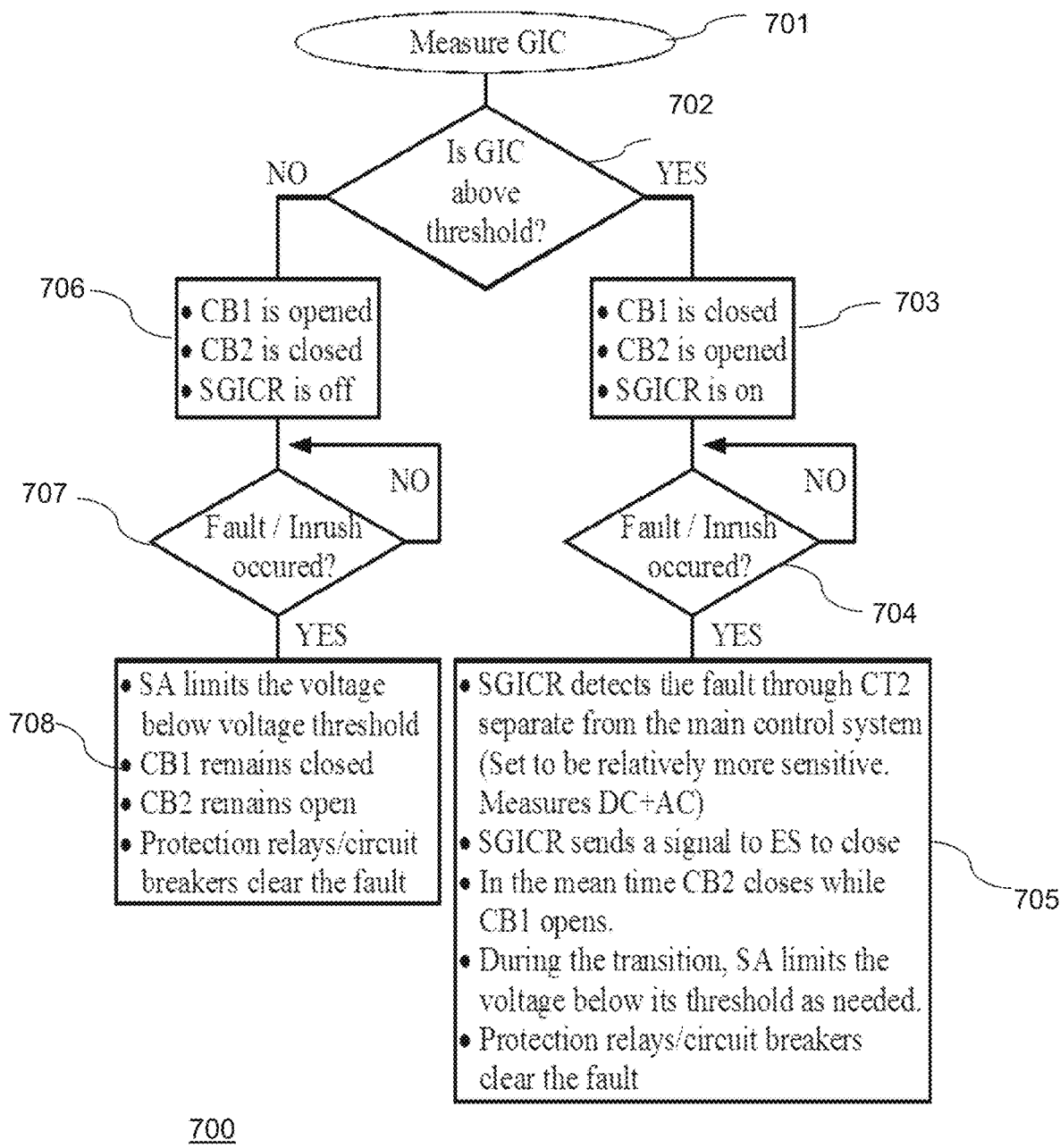
FIG. 7 depicts a fault interruption process, in accordance with an illustrative implementation.

Turning now to FIG. 7, an embodiment of a fault interruption method 700 is disclosed. The operations of the method 700 may be carried out by at least one of the SGICR and a controller. For example, the controller may be used to measure GIC (701) and set a GIC threshold. In addition to setting the GIC threshold, the fault interruption method 700 includes determining whether a GIC is above the threshold (702). If the GIC is above the threshold, then the method includes closing a first circuit breaker CB1, ensuring that the SGICR is on, and opening a second circuit breaker CB2 (703). Next, the method 700 includes determining whether a fault and/or an inrush has occurred (704). If a fault and/or inrush has not occurred, then the controller maintains the system with the first and second circuit breakers CB1 and CB2 being respectively closed and opened, with the SGICR being on.

Referring again to FIG. 7, if a fault and/or inrush has occurred, then the SGICR and surge arrestor SA undertake certain mitigating operations (705). Namely, the SGICR detects the fault through a current transformer such as CT2 as shown in FIGS. 6A-C, and sends a signal to an earthing switch ES to close the ES. Meanwhile, the second circuit breaker CB2 closes, while the first circuit breaker CB1 opens (705). In some embodiments, the SGICR sends a single signal to the ES and CB1 to respectively close and open. Further, protection relays and/or circuit breakers may be used to clear the fault.

The current transformer CT2 is separate from the controller and is configured to be relatively sensitive. Further, the current transformer CT2 should be capable of measuring DC as well as AC current. Such sensitivity is conducive to the detection of DC currents. Thus, when the SGICR is in operation, the GIC detector may be expected to have already detected that a DC voltage is present. In some embodiments, CT2 may comprise a Hall Effect transformer. Additionally, CT2 should be separate from a main control system to protect the SGICR. Meanwhile, the surge arrestor SA limits the voltage below a voltage threshold, and protection relays and line circuit breakers clear the fault (705).

Figure 18:
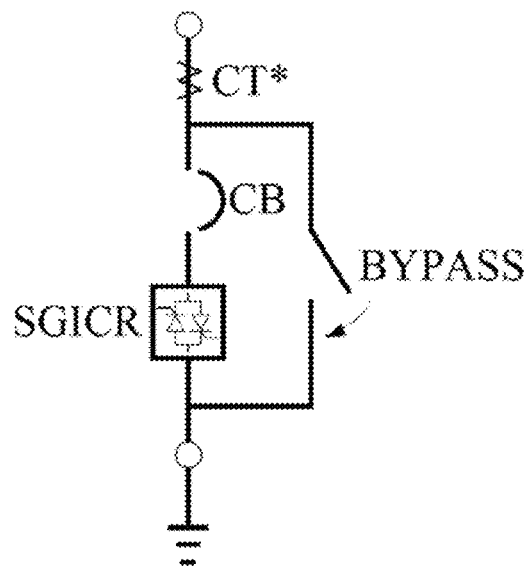
FIG. 18 depicts a portion of a circuit in which GICs are mitigated, in accordance with an illustrative implementation.

FIG. 18 depicts a simplified system in which a current transformer CT* is arranged with the SGICR and a bypass switch. However, some embodiments may include four or more current transformers CT1-CT4, as shown in FIGS. 6A-6C. Various embodiments may include toroid core transformers and secondary winding on core transformers. The plurality of current transformers CT1-CT4 may comprise Hall Effect transformers, toroid core transformers, secondary winding on core transformers, or any combination thereof.

Referring to FIG. 6, current transformer CT1 is provided for line protection relays. Current transformer CT2 is provided for the SGICR, which measures DC as well as AC current. A Hall Effect sensor is suitable for CT2. Furthermore, a GIC detector may also be employed for redundancy. The input from CT2 and the GIC detector are inputted into SGICR logic, such that the SGICR is capable of carrying out operations as outlined in FIG. 7. Current transformers CT3, CT4 are optional and may be used to check the status of circuit breaker CB2 (i.e., whether the circuit breaker CB2 is on or off) and as a redundant input to relays and the SGICR in case the other current transformers fail.

The protection and control relays described above in regard to various embodiments protect the power line. Further, such components serve to detect ground faults, and offer protection to the SGICR. For example, if an SGICR's current rating is a maximum of 500 A for a several milliseconds, the CT2 may set a threshold to 200 A. If the current on the branch exceeds 100 A, a switch-over sequence will be performed. Additionally, DC current may be taken into account for fault mitigation and assessment.

Still in reference to FIG. 7, the controller may determine that the GIC is not above the threshold (702). If the GIC does not exceed the threshold, then the controller causes the first circuit breaker CB1 to be opened, the second circuit breaker CB2 to be closed, and the SGICR to be off (706). Next, the method 700 includes determining whether a fault and/or inrush has occurred (707). If a fault and/or inrush has not occurred, then the controller maintains the first circuit breaker CB1 in an open state and the second circuit breaker CB2 in a closed state, and keeps the SGICR off. On the other hand, if the controller determines that a fault and/or inrush has taken place, then the method 700 includes (1) causing the surge arrestor SA to limit the voltage below a voltage threshold, (2) ensuring that the first circuit breaker CB1 remains closed, (3) ensuring that the second circuit breaker CB2 remains open, and (4) providing for protection relays and/or circuit breakers to clear the fault (708).

In some embodiments, a control system includes an SGICR device that is only operational when GICs are detected. The SGICR goes into mitigation mode automatically once the GIC level measured through a GIC detector is above a given threshold in magnitude and duration. The SGICR exits out of the mitigation mode only as controlled by an operator. This semi-automatic approach is intended to prevent multiple on/off switchovers.

More particularly, in a GIC mitigation mode, the SGICR is configured to be in an on state with circuit breaker CB1 (as shown in FIG. 6C, for example) closed and circuit breaker CB2 and the earthing switch ES open. However, if GIC is not detected or if the GIC is below the GIC threshold, the SGICR is configured to be in an off state, with the circuit breaker CB1 open and circuit breaker CB2 closed, as shown in FIG. 6B. Depending on whether the system is in GIC mitigation mode, the system will handle the fault currents differently, as reflected in FIG. 7.

More particularly, as indicated in FIGS. 6A-C and 7, if the control system is in GIC mitigation mode, SGICR is configured to detect a fault through a current transformer CT2, and stop switching, and the control system is configured to send a control signal that keeps the SGICR open. A trigger at which the control system enters the GIC mitigation mode may be a pre-set instantaneous current value. The pre-set value is such that the SGICR may be maintained in the open state. When the SGICR is in the open state, the only ground connection is through the resistor R while circuit breaker CB1 is opening and circuit breaker CB2 is closing. As the earthing switch ES is faster than circuit breaker CB2, the SGICR may be temporarily bypassed during the transition of current from circuit breaker CB1 to circuit breaker CB2 for a permanent bypass. The voltage that builds across the resistor and the SGICR is limited through the surge arrester SA during the transition. However, if the system is not in the GIC mitigation mode, the circuit breaker CB2 remains closed, and the circuit breaker CB1 remains open until the fault is cleared and the GIC is detected.

Furthermore, in some embodiments, in order to provide a fast bypass route around the SGICR, the earthing switch ES is used. The earthing switch ES allows for current to be safely diverted away from SGICR before current levels through the SGICR exceed the SGICR's current threshold. The earthing switch ES may switch quickly. Such switches are already commercially available as Ultra-Fast Earthing Switches (UFES), which close in less than 1.5 ms. The earthing switch ES is used to provide a temporary bypass while the circuit breakers take 1 or 2 cycles to establish permanent bypass to ground.

At the same time, line breakers are also sent a trip signal to clear the fault. During the transition, any transient voltage is drained through the surge arrestor SA and a ground is maintained through resistor R. Further, in some embodiments, the circuit breaker CB1 is redundant to line circuit breakers. Hence, circuit breaker CB1 can be replaced with a fuse for cost/space savings. Additionally, circuit breaker CB2 is not used to interrupt current but to provide a solid connection to ground. Therefore, circuit breaker CB2 may be replaced with a circuit switcher or special equipment built for fast-closing implementations.

While the permanent bypass is being established, the spark gap and/or surge arrestor SA may operate as well. Additionally, for surge protection, a voltage threshold of the SGICR may be set. The threshold may be, for example, one tenth ($1/10$) of the line rating. The surge arrestor SA's protective level can be set lower than that of the SGICR withstand rating. However, the rating of the SA should be chosen such that the existing transformer neutral is also protected. Also, during normal operation (no GIC in the system), the SGICR can be easily bypassed. One of the benefits of such embodiments in comparison to capacitor type GIC blocking is that the SGICR only reduces the GIC, without blocking GIC as the capacitor does. Depending on the duty cycle, GIC may pass through the transmission line, but does not do so long enough to saturate the core.

If a surge occurs while the SGICR is in operation, the system transfers to the bypass route and to the circuit breaker CB2 while there are voltage transients where the voltage threshold may be exceeded. However, the surge arrestor would sink the voltage before the voltage exceeds the SGICR's voltage threshold. Thus, the earthing switch ES is rated based on the voltage threshold, which is generally far less than the line voltage. In this manner, equipment costs may be saved. That is, the earthing switch ES is a fast switch (e.g., 1.5 ms), and when circuit breaker CB1 (which is replaceable by a fuse) circuit breaker CB2 closes. Circuit breaker CB2 closes in a maximum of two cycles.

During the transition period, if the voltage exceeds the surge arrestor SA's protective level, the SA sinks the voltage. Thus, in such embodiments, the SGICR is configured in accordance with the operating principles that the ground should be connected with respect to the AC voltage in normal operation and should be disconnected with respect to the DC voltage when GICs are experienced. The quality of the connection with the ground is dictated (at least in part) by the parameters of switching frequency and duty cycle.

Inasmuch as switching frequency and duty cycle may both significantly impact the connection quality, values for these parameters should be carefully selected. Considerations for switching frequency and duty cycle are now discussed in turn.

The switching frequency should be selected such that the reference to ground is not lost. To keep the neutral instantaneous voltage within acceptable values, the neutral should be grounded at a high frequency. Further, an upper limit of the frequency is determined by semiconductor switching capabilities. If the switching frequency is too low, the neutral voltage may reach high values that would cause insulation and/or safety issues. In addition, a lower frequency operation may hinder the detection of ground faults.

The duty cycle determines how long the neutral is disconnected from the ground within each cycle of the SGICR switching operation. The length of time when the neutral is in an open state determines the extent to which the GIC is attenuated. For a more severe GIC, the duty cycle should be small so that more of the GIC is cut off. For a more mild GIC, the duty cycle may be set to be relatively larger. The smallest value for the duty cycle—corresponding to the maximum extent to which the GIC may be cut off—is determined by semiconductor switching capabilities including but not limited to rise time, fall time, and heating, as well as other control system characteristics.

In at least one embodiment, the SGICR requires relatively little modification of existing protection relays because SGICR facilitates ground fault detection by frequently closing neutral to ground. Once the fault is detected, the SGICR is bypassed within 1.5 ms using UFES as mentioned above. At the same time, the permanent bypass is triggered as described above, restoring the neutral to a solidly grounded system. The on/off status from the SGICR and its switching frequency are entered into the neutral/ground elements of relays, so that the frequency of the SGICR may be filtered out. Since the SGICR is not switching line current, no additional harmonics due to SGICR are expected, and none were observed during simulations. On the contrary, the SGICR of at least one embodiment reduces half-cycle saturation and the harmonics associated with it.

In some embodiments, a feedback control circuit may be established in which error will be determined by the difference between actual GIC reading and a predefined GIC level, i.e., a 50% GIC threshold. As the error may become large at first, the duty cycle may reach its lower boundary. As the error decreases, the duty cycle may reach its upper boundary. The upper and lower boundaries may be determined based on a rise time and fall time of the SGICR as well as inductance, as indicated by ends of the transformer neutrals, given that the inductance that resists a change in current.

Further, in some embodiments, the SGICR may go into operation automatically, but an operator controls the SGICR to exit (i.e., stop performing) the operation. In this manner, thousands of switchovers between the SGICR and the permanent bypass switch may be beneficially reduced or avoided, because GICs may be experienced for consecutive days.

Figure 8:
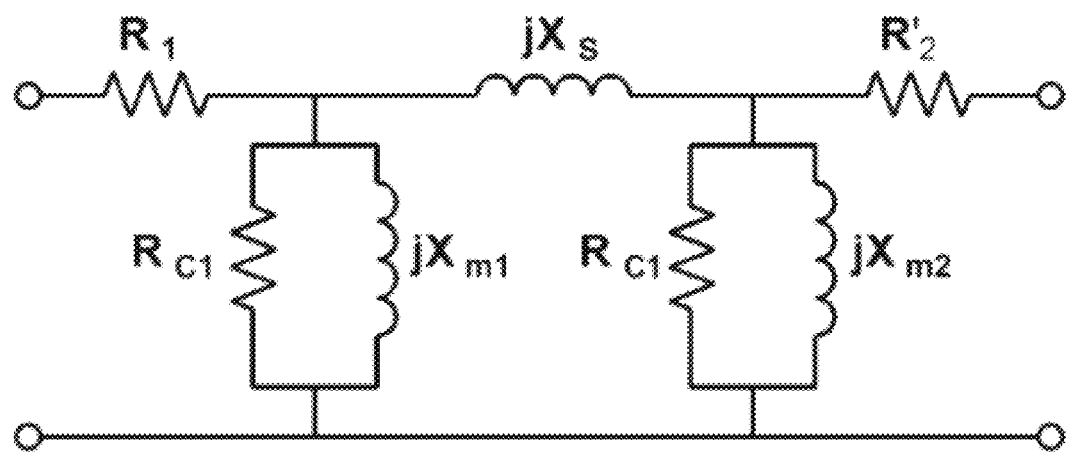
FIG. 8 depicts a transformer model, in accordance with an illustrative implementation.

Referring now to FIG. 8, an embodiment based on a pi (π) transformer model is depicted. Embodiments based on π transformer models may produce more accurate results for transient saturation than the traditional Steinmetz T model. Further, hysteresis models may be used in lieu of saturation models for simulation of the transformer core, as discussed in F. de Leon, A. Farazmand, and P. Joseph, "Comparing the T and Equivalent Circuits for the Calculation of Transformer Inrush Currents," *IEEE Trans. Power Delivery*, vol. 27, No. 4, pp. 2390-2398 (2012), which is hereby incorporated by reference in its entirety for the concepts and background information described therein.

At least some embodiments, including the embodiment of FIG. 8, were subjected to simulations conducted on a simple two bus 230/500 kV system. For some embodiments, the SGICR was structured as a controlled switch and a signal generator. Certain characteristic values for the system were adapted from R. P. Jayasinghe, "Investigation of Protection Problems due to Geomagnetically Induced Currents," Ph.D. Dissertation, Dept. Elec. Eng., Univ. Manitoba, Winnipeg, Manitoba, Canada, (1997) and applied to a two-bus system.

Figure 9:
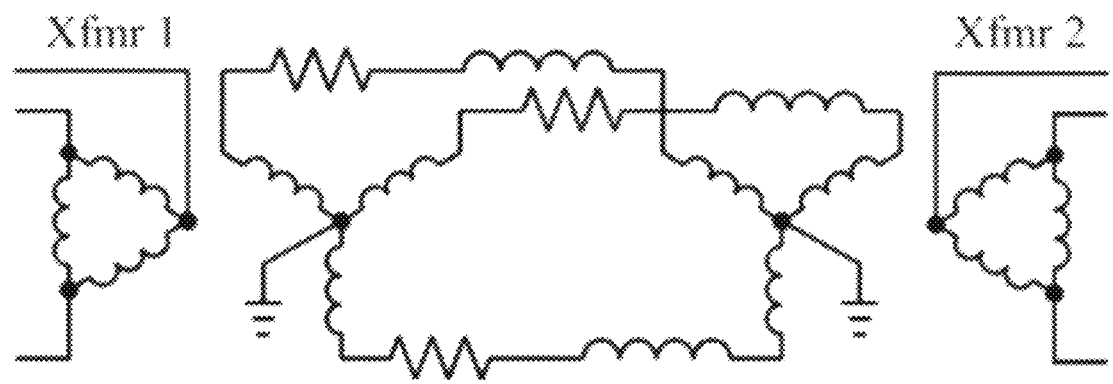
FIG. 9 depicts a power system, in accordance with an illustrative implementation.

Among other things, single phase transformers arranged in delta-wye banks were simulated. In such an arrangement, the GMD voltage difference increases as the length between two transformer banks increases. Further, as noted above, single phase transformers are most vulnerable to GICs. In at least one simulation, 240 MVA single phase transformers arranged in delta-wye banks were simulated, where the primary resistance was 0.015 Ohms and secondary resistance was 0.219 Ohms. The transformers were connected through a 500 km transmission line, as shown in FIG. 9. The total DC line resistance was 20 Ohms, with 6 V/km used for the DC voltage across the line. The operating source was assumed to be exactly 1 pu. All simulations were conducted using composite network modeling to facilitate future simulations of larger systems.

In addition, it was assumed that the GMD at each transformer neutrals was of opposite polarity. This assumption reflects the worst case scenario inasmuch as the opposite polarity at each transformer neutral would cause the maximum DC voltage difference between the two neutral points. All simulations were conducted using EMTP-RV software developed by Powersys Solutions using composite networks modeling to facilitate simulations of larger systems.

Figure 10A:
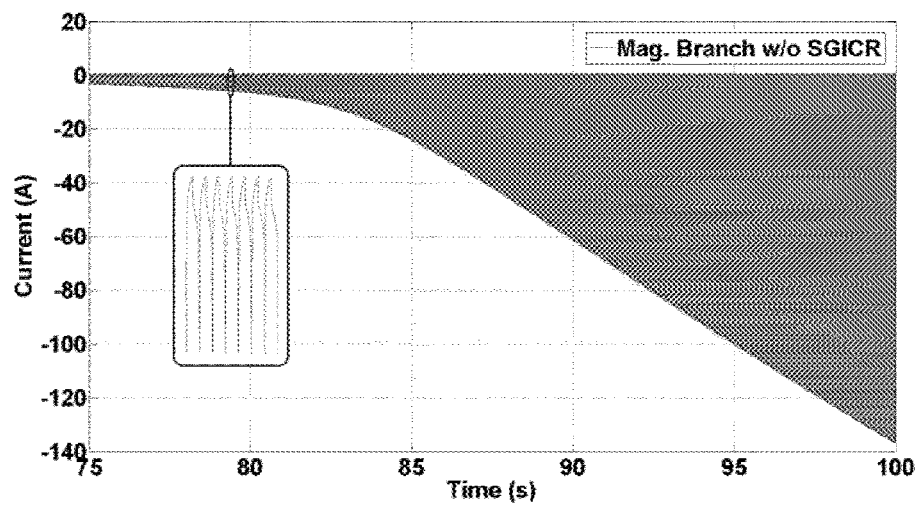
FIG. 10A depicts the relationship between current and time for a magnetizing branch current in a system without a semiconductor GIC reducer.
Figure 10B:
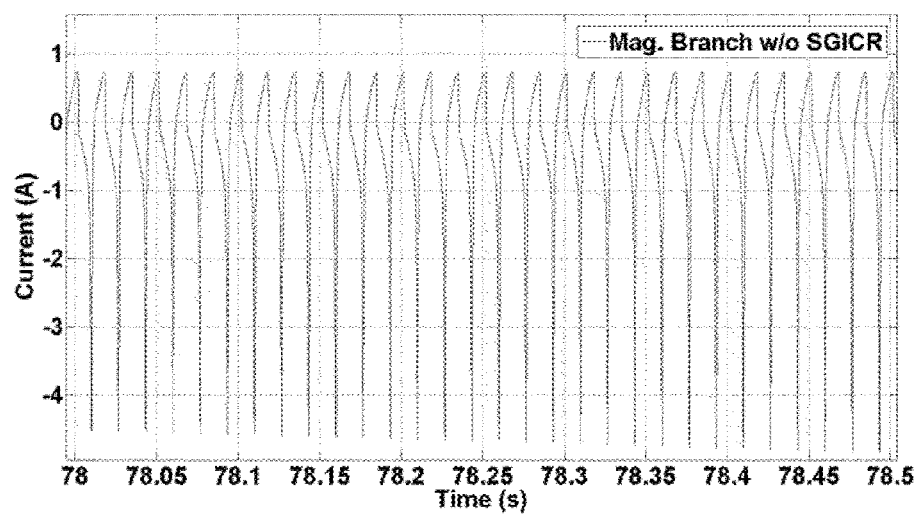
FIG. 10B depicts the relationship between current and time for a half-cycle saturation, in a system without a semiconductor GIC reducer.
Figure 10C:
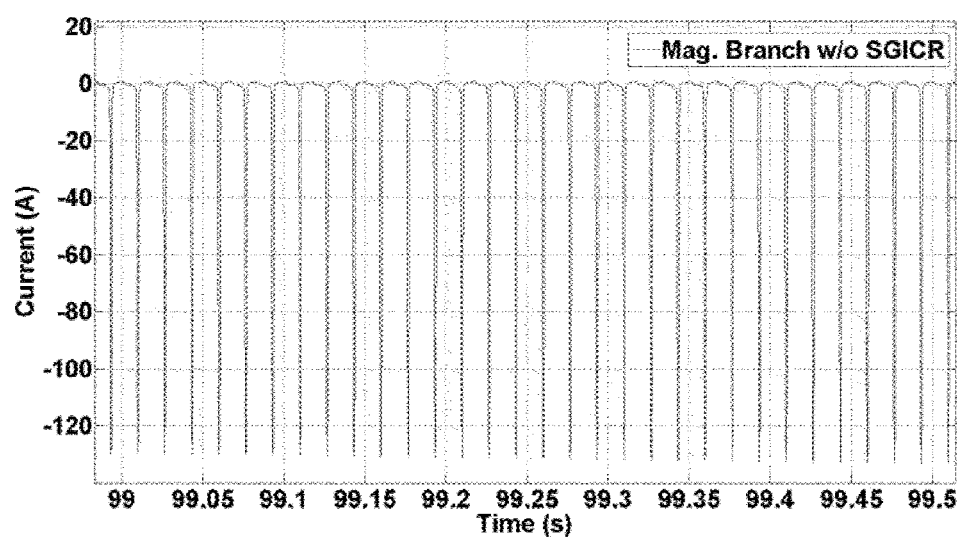
FIG. 10C is a detail view of a portion of the plot shown in FIG. 10A for a heavy saturation, in a system without a semiconductor GIC reducer.

FIGS. 10A-10C depict results obtained from a system in which the neutral is solidly grounded. More particularly, FIG. 10A depicts a plot of current versus time for a magnetizing branch current without SGICR and with solid grounding of the neutral. FIG. 10B depicts a half-cycle saturation for the magnetizing branch current without SGICR and with solid grounding. FIG. 10C depicts a magnified portion of FIG. 10A during a heavy saturation period. As indicated by FIGS. 10A-10C, the half-cycle saturation increases as long as the GMD voltage is present at the neutral.

Figure 11:
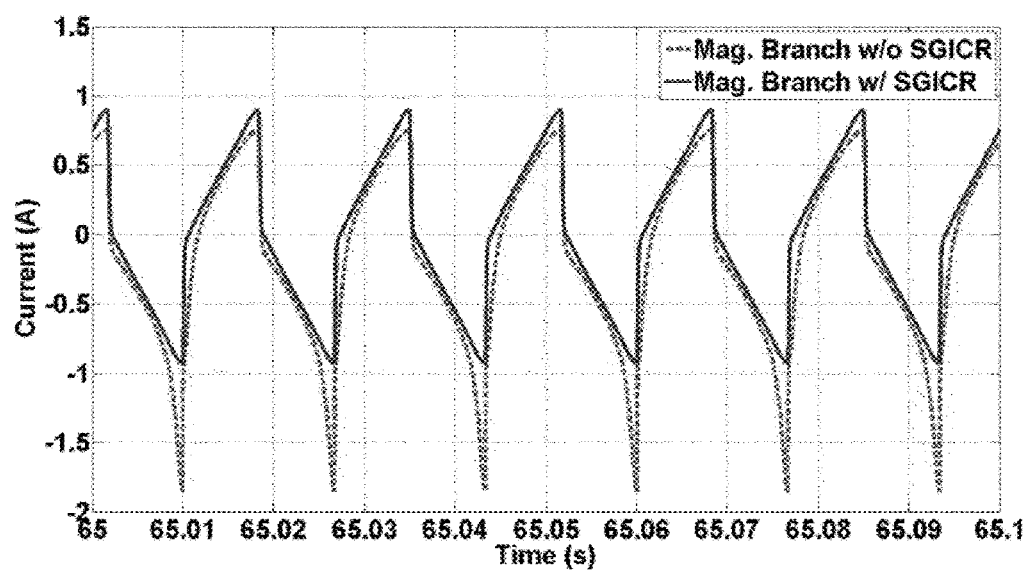
FIG. 11 depicts magnetizing branch currents with and without a semiconductor GIC reducer as a half-cycle saturation is initiated, in accordance with an illustrative implementation.
Figure 12:
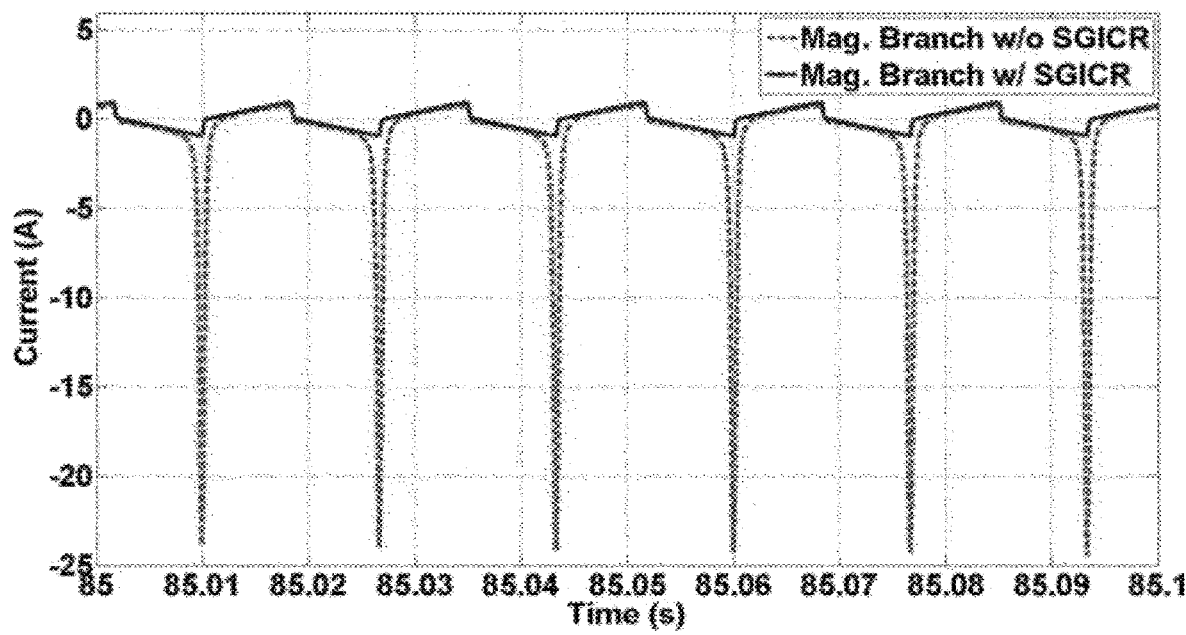
FIG. 12 depicts a magnetizing branch current with and without a semiconductor GIC reducer as a deep half-cycle saturation is established, in accordance with an illustrative implementation.

FIGS. 11 and 12 depict results for the magnetizing branch currents of two systems with and without SGICR. In FIGS. 11 and 12, the solid lines are the results for the system without SGICR, while the dashed line depicts results for the system utilizing SGICR. FIG. 11 allows for comparison of the currents of both systems while a half-cycle saturation begins to occur. FIG. 12 allows for comparison of the magnetizing branch currents for both systems as a deep half-cycle saturation. It was observed that as a GIC begins to cause the half-cycle saturation in the system without SGICR, the system with SGICR maintains normal operation.

Figure 13:
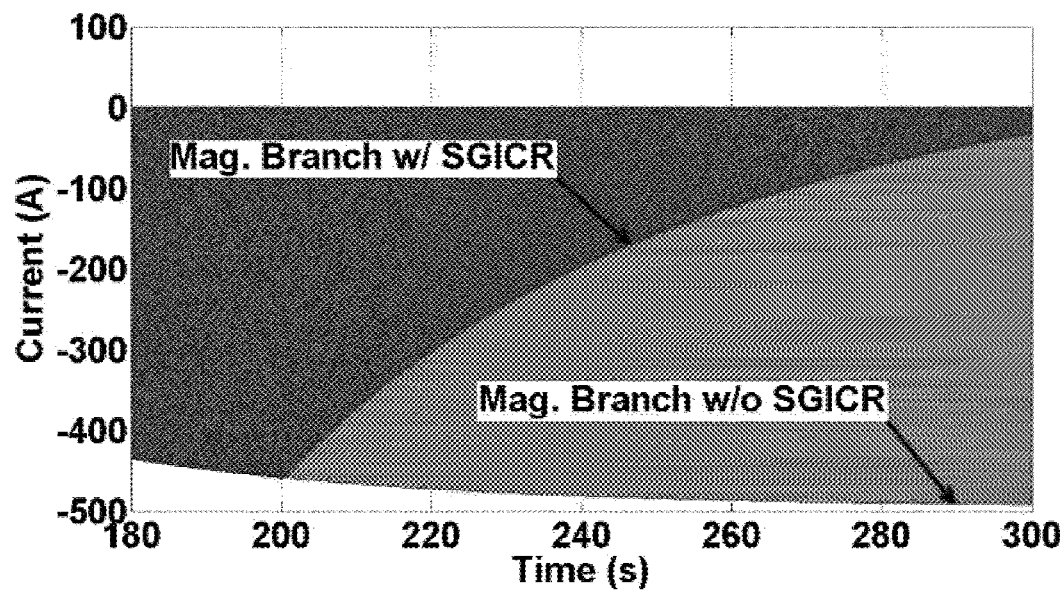
FIG. 13 depicts a comparison of a magnetizing branch current with and without semiconductor GIC reducer, in accordance with an illustrative implementation.

FIG. 13 depicts a comparison of results from systems with and without SGICR. The system with SGICR was shown to be effective when the system is permitted to become half-cycle saturated. Once a deep half cycle saturation is established, the SGICR is turned on. As shown in FIG. 13, mitigation of the current begins as soon as the SGICR is turned on, whereas the system without SGICR remains in saturation.

Figure 14:
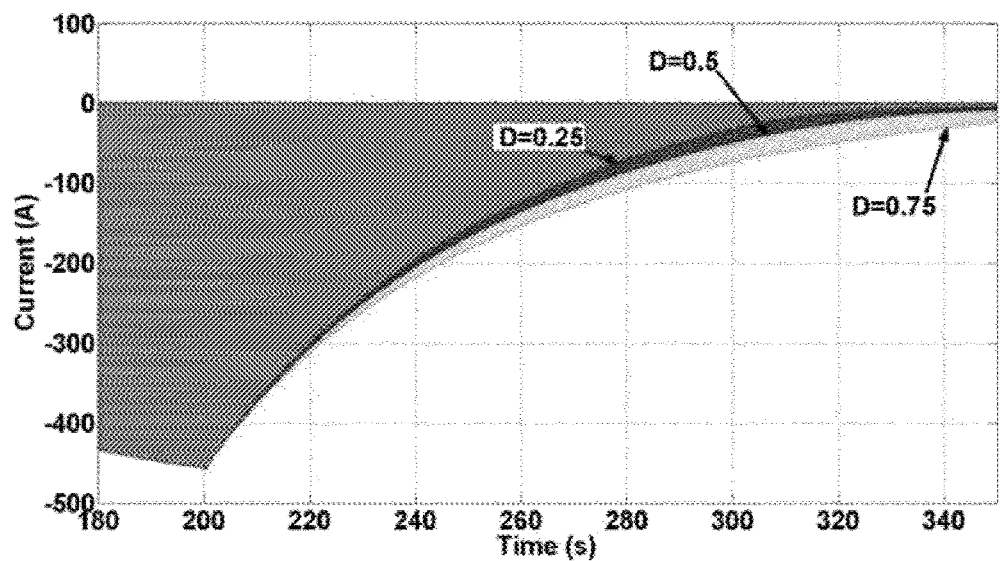
FIG. 14 depicts a duty cycle comparison of a system with a semiconductor GIC reducer in accordance with an illustrative implementation.
Figure 15:
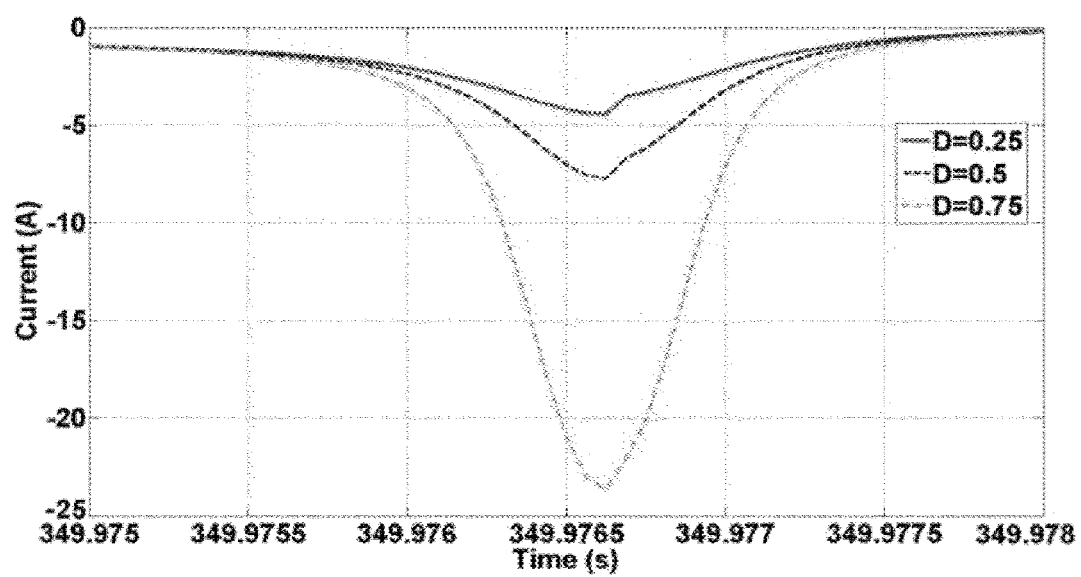
FIG. 15 depicts a duty cycle comparison of a system with a semiconductor GIC reducer in accordance with an illustrative implementation.

Turning now to FIG. 14, duty cycles of D=0.25, D=0.5, and D=0.75 are compared for a system with SGICR. As indicated in FIG. 14, the duty cycle impacts the saturation. FIG. 15 provides a comparison of duty cycles for a narrow window of time, among the last time values plotted in FIG. 14. The results depicted in FIGS. 14 and 15 were obtained with the SGICR being turned on after a half-cycle saturation with different duty cycles. As was observed, all three duty cycles successfully reduced the saturation, with smaller duty cycles observed to have a greater reduction effect.

As described herein, in at least one implementation the method includes connecting a plurality of switching devices at a neutral grounding connection point of at least one transformer bank. In a system having two terminals, the method includes grounding one transformer bank through a switch so as to reduce GICs. In a system having more than two terminals, the method includes grounding transformer banks through multiple switches, where the reduction is performed independently for each transformer bank. The method further involves determining a switching frequency and a duty cycle based on an evaluation of factors including effectiveness and fault current detection.

The switching device can be any suitable semiconductor technology such as IGBT (insulated gate bipolar transistor), GTO (gate turn-off thyristor) etc. and have any switching technology such as pulse width modulation (PWM). The controls can be any suitable control logic such as proportional (P), proportional plus derivative (PI), proportional, derivative and integral (PID) or lead lag compensation.

In at least one implementation, at least one resistor is placed in parallel to SGICR, in order to provide a solid connection at the neutral for safety purposes. The neutral switcher, along with the resistor that is high in value, effectively functions as a variable resistor.

In at least one implementation, a switching device is connected in parallel, such as CB2 in FIG. 18, in order to be able to take the neutral switch out of service and solidly ground the neutral of the transformer as needed. This may be necessary for maintenance or during the absence of GIC. CB2 in FIG. 18 can be a mechanical device such as a manual switch, load break switch, motor operated switch, a circuit breaker, or semiconductor based switch. CB2 is to work together with CB1 to put the SGICR in service or take it out of service.

In at least one implementation, especially where the SGICR is not rated for system ratings, a fast by-pass switch is provided to protect the switcher against a fault during GIC mitigation. In addition, a surge arrester or spark gap is also connected in parallel to provide insulation coordination to both SGICR and the transformer neutral.

In at least one implementation, SGICR is rated much lower than the system ratings such as voltage and fault levels; therefore, it is protected a protection system, which may include any combination of a fast by-pass switch, resistor, and/or surge arrestor. In this scheme, in the case of a fault when the SGICR is in service, the SGICR remains open at first zero crossing and the protection system takes over to re-route the fault current. CB1 together with CB2 enables putting the SGICR in service or taking it out of the service.

In at least one implementation, SGICR is rated at the system current, voltage and fault levels, where it can still be protected by any combination of a fast by-pass switch resistor, and/or surge arrestor. In this scheme, in the case of a fault when the SGICR is in service, the SGICR remains closed at first zero crossing and allow the current to flow through it. CB1 together with CB2 enables putting the SGICR in service or taking it out of the service.

In at least one implementation, switching at the neutral point in a two bus 230/500 kV system effectively mitigates the GIC. Furthermore, at least one implementation according to the above-described methods mitigates the effect of GIC on high voltage power systems. The neutral switching of at least some embodiments produces an open circuit to GIC and a closed circuit for fault currents and does not affect overall system operations such as fault detection, insulation coordination, and safety. By frequently grounding the neutral connection of each transformer bank and employing SGICR as described above, GICs may be advantageously reduced.

Figure 16:
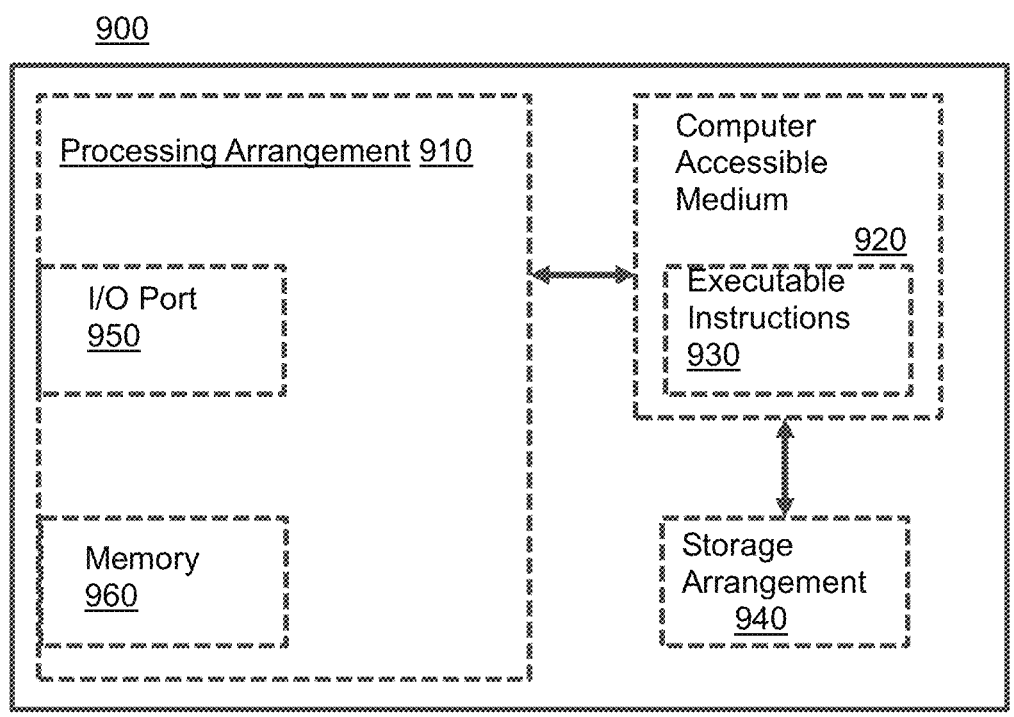
FIG. 16 depicts a system including a controller for GIC reduction, according to an illustrative implementation.

In one implementation, a computer system 900 is provided. As shown in FIG. 16, the computer system 900 includes a computer-accessible medium 320 (e.g., as described herein, a storage device such as a hard disk, floppy disk, memory stick, CD-ROM, RAM, ROM, etc., or a collection thereof) which may be provided, for example, in communication with a processing arrangement 910. The computer-accessible medium 920 may be a non-transitory computer-accessible medium. In some implementations, the system 900 may include software. Such software may include instructions for planning the neutral switching arrangement to be provided and for monitoring performance.

The computer-accessible medium 920 can contain executable instructions 930 thereon. In one implementation, in addition or alternatively, a storage arrangement 940 can be provided separately from the computer-accessible medium 920, which can provide the instructions to the processing arrangement 910 so as to configure the processing arrangement to execute certain exemplary procedures, processes and methods, as described herein, for example. The instructions may include a plurality of sets of instructions.

System 900 may also include a display or output device, an input device such as a key-board, mouse, touch screen or other input device, and may be connected to additional systems via a logical network. Many of the implementations described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols.

Those skilled in the art can appreciate that such computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments and/or implementations are described in the general context of method steps, which may be implemented in one embodiment by a program product including computer-executable instructions, such as program code, executed by computers in networked or stand-alone environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software implementations of the present invention could be accomplished with standard programming techniques with rule based logic and other logic. It should also be noted that the words "component" and "module," as may be used herein and in the claims, are intended to encompass implementations using one or more lines of software code, and/or hardware implementations, and/or equipment for receiving manual inputs.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity. Use of the masculine pronoun is intended to include both the feminine and gender-neutral pronouns, and vice versa.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. Therefore, the above implementations should not be taken as limiting the scope of the invention.

The invention claimed is:

1. A method for reducing a geomagnetically induced current in a system including at least one current transformer, a current reduction device, first and second circuit breakers, a bypass device, and a surge arrestor connected in parallel between a transformer neutral and a ground, the method comprising:
    setting a current threshold for the geomagnetically induced current;
    determining whether the geomagnetically induced current exceeds the current threshold;
    when the geomagnetically induced current exceeds the current threshold, closing the first circuit breaker, opening the second circuit breaker, and causing the current reduction device to be in an operational state;
    when the geomagnetically induced current does not exceed the current threshold, opening the first circuit breaker, closing the second circuit breaker, and causing the current reduction device to be in a non-operational state; and
    determining a switching frequency and a duty cycle for the current reduction device.

2. The method of claim 1, further comprising:
    determining whether at least one of a fault and an inrush has occurred.

3. The method of claim 2, further comprising:
    after determining that the geomagnetically induced current does not exceed the current threshold, limiting, by the surge arrestor, voltage so as to be less than a voltage threshold;
    maintaining the bypass device in a closed state;
    maintaining the circuit breaker in an open state; and
    providing for at least one of a protection relay and a line circuit breaker to clear the at least one of the fault and the inrush.

4. The method of claim 2, further comprising:
    after determining that the geomagnetically induced current exceeds the threshold, detecting, by the current reduction device, a fault through a current transformer;
    sending, by the current reduction device, at least one signal;
    limiting, by the surge arrestor, voltage so as to be less than a voltage threshold; and
    providing for at least one of a protection relay and a line circuit breaker to clear the at least one of the fault and the inrush.

5. The method of claim 4, wherein sending the at least one signal comprises instructing the bypass device to be in a closed state and instructing the circuit breaker to be in an open state.

6. The method of claim 4, wherein the current reduction device sends the signal while the surge arrestor limits the voltage so as to be less than the voltage threshold.

7. The method of claim 2, further comprising operating the current reduction device upon detection of the geomagnetically induced current.

8. The method of claim 2, further comprising diverting current through the bypass device via a spark gap in parallel between the transformer neutral and the ground.

9. The method of claim 2, wherein the bypass device comprises one of an earthing switch and a thyristor valve.

10. The method of claim 2, wherein the current reduction device comprises at least one of a gate turn-off thyristor and an insulated gate bipolar transistor.

11. The method of claim 2, wherein the current reduction device is configured to reduce a half-cycle flux of current flowing to the at least one current transformer.

12. The method of claim 1, wherein the threshold voltage for the surge arrestor is lower than a threshold voltage of the current reduction device.

13. A system configured to mitigate a geomagnetically induced current, comprising:
    a current reduction device configured to reduce the geomagnetically induced current,
    at least one circuit breaker;
    at least one surge arrestor configured to limit voltage below a voltage threshold;
    a bypass device configured to bypass a semiconductor device during a ground fault;
    at least one resistor configured to provide connection between a neutral of a transformer bank and a ground, and
    a detector configured to detect the geomagnetically induced current,
    wherein the bypass device, resistor, surge arrestor, current reduction device and circuit breaker are connected in parallel between the neutral and the ground and further wherein the current reduction device is configured to switch at a frequency of 1.2 kHz and to operate with a duty cycle between 0.25-0.75.

14. The system of claim 13, wherein the current reduction device enters an operational state when the detector detects that the geomagnetically induced current is present.

15. The system of claim 13, further comprising a spark gap configured in parallel between the neutral and the ground so as to divert current through the bypass device.

16. The system of claim 13, wherein the bypass device comprises one of an earthing switch and a thyristor valve.

17. The system of claim 13, wherein the current reduction device comprises at least one of a gate turn-off thyristor and an insulated gate bipolar transistor.

18. The system of claim 13, wherein the current reduction device is configured to reduce a half-cycle flux of current flowing to at least one of a plurality of current transformers of the transformer bank.

19. A computer-implemented machine for reducing a geomagnetically induced current in a system comprising:
- at least one current transformer, a current reduction device, first and second circuit breakers, a bypass device, and a surge arrestor connected between a transformer neutral and a ground
- a processor; and
- a non-transitory tangible computer-readable medium operatively connected to the processor and including computer code configured to:
  - set a current threshold for a geomagnetically induced current;
  - detect the geomagnetically induced current;
  - determine whether the geomagnetically induced current exceeds the threshold;
  - when the geomagnetically induced current exceeds the current threshold, closing the first circuit breaker, opening the second circuit breaker, and causing the current reduction device to be in an operational state;
  - when the geomagnetically induced current does not exceed the current threshold, opening the first circuit breaker, closing the second circuit breaker, and causing the current reduction device to be in a non-operational state; and
  - determine a switching frequency and a duty cycle for the current reduction device.

* * * * *